United States Patent
Ferreira et al.

(10) Patent No.: US 11,247,693 B2
(45) Date of Patent: Feb. 15, 2022

(54) SYSTEM AND METHOD FOR CREATING A PET-FRIENDLY AUTOMOTIVE ENVIRONMENT

(71) Applicant: Ford Global Technologies, LLC, Dearborn, MI (US)

(72) Inventors: Francisco Ferreira, Estado de Mexico (MX); Luis Flores Alonso, Mexico City (MX); Itzel Garrido, Lerma (MX); Luis Becerril, Tultitlan (MX)

(73) Assignee: Ford Global Technologies, LLC, Dearborn, MI (US)

(*) Notice: Subject to any disclaimer, the term of this patent is extended or adjusted under 35 U.S.C. 154(b) by 546 days.

(21) Appl. No.: 16/170,090

(22) Filed: Oct. 25, 2018

(65) Prior Publication Data

US 2020/0130702 A1   Apr. 30, 2020

(51) Int. Cl.
*B60W 50/00* (2006.01)
*B60N 2/02* (2006.01)
(Continued)

(52) U.S. Cl.
CPC ..... *B60W 50/0098* (2013.01); *B60H 1/00964* (2013.01); *B60N 2/0248* (2013.01);
(Continued)

(58) Field of Classification Search
CPC ............ B60W 50/0098; B60W 10/30; B60W 2556/45; B60W 2710/30; B60N 2/0248;
(Continued)

(56) References Cited

U.S. PATENT DOCUMENTS 6,314,352 B1 * 11/2001 Kunimatsu ............ G01C 21/26
340/996
6,785,595 B2 * 8/2004 Kominami ........... B60N 2/0248
340/426.25
(Continued)

FOREIGN PATENT DOCUMENTS

CN        105844849 A   *   8/2016

OTHER PUBLICATIONS

Toad Security. Ai606 and Ai606LCV Alarm System User Guide (6 Pages).
(Continued)

*Primary Examiner* — Abby Y Lin
*Assistant Examiner* — Danielle Marie Jackson
(74) *Attorney, Agent, or Firm* — Brandon Hicks; Eversheds Sutherland (US) LLP

(57) ABSTRACT

A key fob includes selectors for performing conventional remote operations (e.g., locking/unlocking doors) as well as a "pet mode" selector. When the pet mode selector is pressed by a user, a coded wireless signal is sent to a vehicle computer. The vehicle computer is operatively connected to multiple vehicle systems that each controls various features of the vehicle. Responsive to receipt of the coded wireless signal, the vehicle computer instructs a selected group of the systems to operate in a specified manner so as to create a comfortable environment for a pet within the vehicle. For example, in pet mode, the vehicle computer may cause one or more windows to lower, the sunroof to open the trunk lift gate to pivot open, and the seat backs of one or more rows of seats to tilt or fold down.

18 Claims, 6 Drawing Sheets

(51) Int. Cl.
*B60H 1/00* (2006.01)
*B60W 10/30* (2006.01)
*E05F 15/73* (2015.01)
*H04W 4/40* (2018.01)
*A01K 11/00* (2006.01)
*H04W 4/80* (2018.01)

(52) U.S. Cl.
CPC ............ *B60W 10/30* (2013.01); *E05F 15/73* (2015.01); *H04W 4/40* (2018.02); *A01K 11/006* (2013.01); *B60N 2002/0268* (2013.01); *B60W 2556/45* (2020.02); *B60W 2710/30* (2013.01); *E05Y 2900/531* (2013.01); *E05Y 2900/542* (2013.01); *E05Y 2900/548* (2013.01); *E05Y 2900/55* (2013.01); *H04W 4/80* (2018.02)

(58) Field of Classification Search
CPC ......... B60N 2002/0268; B60H 1/00964; E05F 15/73; H04W 4/40; H04W 4/80; H04W 4/48; E05Y 2900/542; E05Y 2900/548; E05Y 2900/55; E05Y 2900/531; A01K 11/006; H04L 67/12; G06F 3/011; B60R 16/037; B60R 16/02
See application file for complete search history.

(56) References Cited

U.S. PATENT DOCUMENTS

| | | | |
|---|---|---|---|
| 9,384,647 B1* | 7/2016 | Arnold | G08B 21/02 |
| 9,593,522 B1 | 3/2017 | Murar et al. | |
| 2010/0302022 A1* | 12/2010 | Saban | B60N 2/002 340/459 |
| 2012/0029729 A1* | 2/2012 | Weslati | B60H 1/00385 701/2 |
| 2017/0039835 A1* | 2/2017 | Brankovic | H01Q 9/285 |
| 2017/0158186 A1* | 6/2017 | Soifer | B60H 1/00742 |
| 2017/0341529 A1* | 11/2017 | Uno | B60N 2/01 |
| 2019/0337527 A1* | 11/2019 | Jurgenowski | G05B 15/02 |
| 2020/0079322 A1* | 3/2020 | Crocker | G07C 9/29 |

OTHER PUBLICATIONS

Mobile Automotive Systems (2018). Digital Systems Tytan DS410. http://www.mobileautomotivesystems.co.uk/products/alarm-immobilisers/digital-systems-tytan-ds410.html.

Mazda. 2013 Mazda CX-9 Smart Start Guide. Published Oct. 15, 2012 (16 Pages).

Tesla. Tesla Model X Owner's Manual. Published Mar. 22, 2018 (208 pages).

* cited by examiner

SYSTEM AND METHOD FOR CREATING A PET-FRIENDLY AUTOMOTIVE ENVIRONMENT

TECHNICAL FIELD

The present disclosure relates generally to automobiles and more specifically to a system and method for creating a pet-friendly automotive environment.

BACKGROUND

Pets enrich our lives in many ways, and keeping pets comfortable and safe is important. However, transporting a pet in an automotive vehicle can be difficult. Although some pet owners simply put their pet in a cage in the back of a vehicle, others wish to provide better conditions. However, the process of creating such an environment (e.g., lowering windows, manually tilting back seats) can be cumbersome.

Furthermore, particularly in the case of a dog, while creating a nice, comfortable environment, the owner may have to deal with an impatient animal, which can distract the owner and create stress for both the owner and the pet.

BRIEF DESCRIPTION OF THE DRAWINGS

For a more complete understanding of the present disclosure and certain features thereof, reference is now made to the following description, in conjunction with the accompanying figures briefly described as follows.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like, but not necessarily the same or identical, elements throughout.

Figure 1:
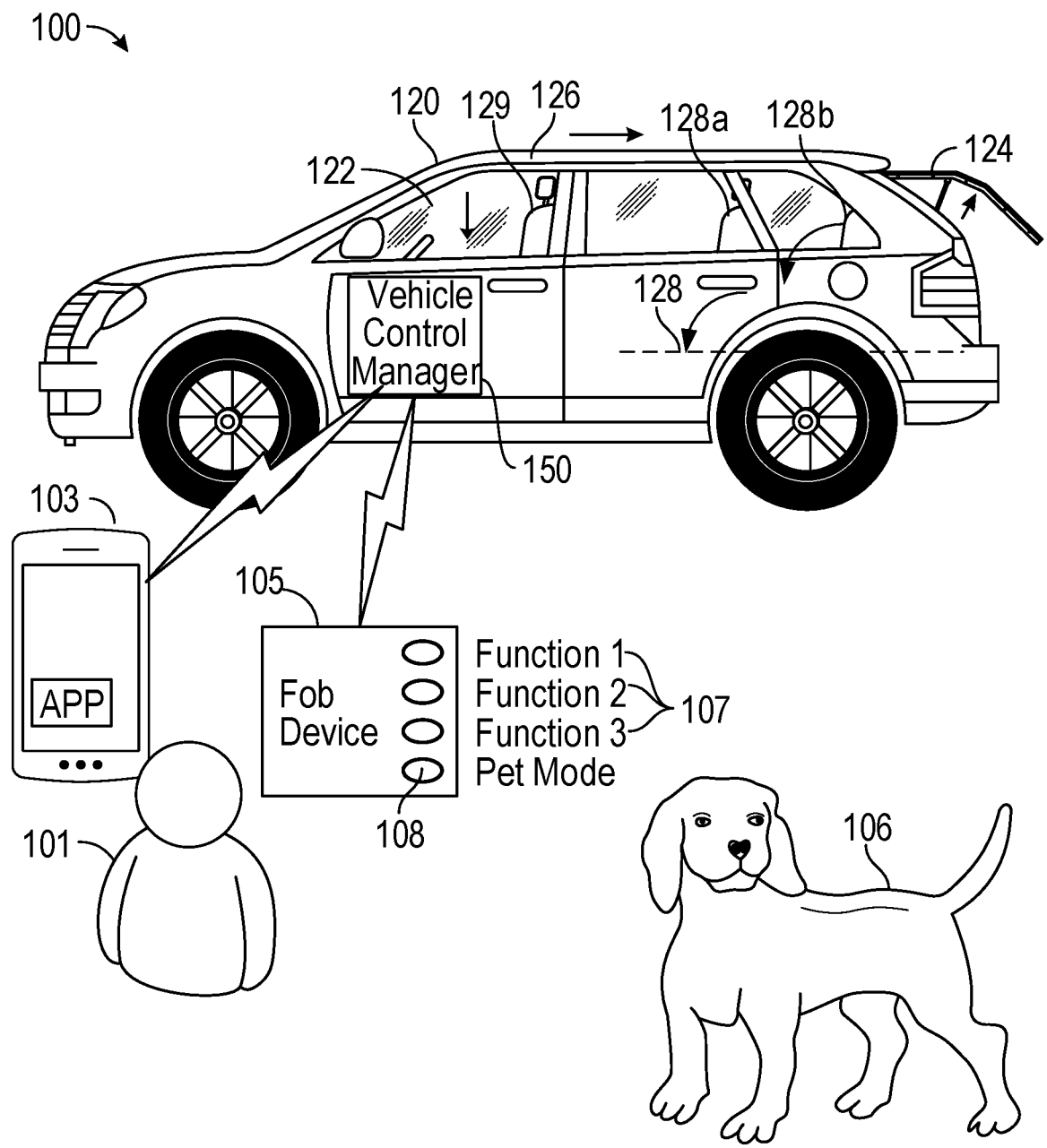
FIG. 1 shows an example system for creating a pet-friendly automotive environment, according to example embodiments of the disclosure.

Referring to FIG. 1, an example system 100 for creating a pet-friendly automotive environment in an automotive vehicle is illustrated. As shown, the system for creating a pet-friendly automotive environment 100 includes an automotive vehicle 120 equipped with a vehicle computer therein, such as a vehicle control manager computer 150. The vehicle control manager computer 150 can be communicably coupled to numerous functions and features of the automotive vehicle 120 to monitor and control various aspects therein.

The system 100 can also include a hand-held key fob 105 configured to wirelessly communicate with the vehicle control manager computer 150. In certain example embodiments, the key fob 105 includes multiple buttons 107 or the like ("selectors") for manual activation (e.g., depression) by a user 101 to wirelessly transmit signals to the vehicle control manager computer 150 to perform conventional remote operations on the automotive vehicle 120. Examples of conventional remote operations executable using the key fob 105 can include locking doors, unlocking doors, activating interior/exterior lights of the automotive vehicle 120, opening a trunk of the vehicle 120, operating an alarm at the vehicle 120, and starting the engine of the vehicle 120.

In addition, the key fob 105 can include a "pet mode" selector for manual activation by a user 101. When the pet mode selector 108 is pressed (or otherwise selected) by a user 101, a coded wireless signal is sent to the vehicle control manger computer 150. Responsive to receipt of the coded wireless signal, the vehicle control manger computer 150 instructs a selected group of the systems within the automotive vehicle 120 to operate in a specified manner so as to create a comfortable environment for a pet 106 within the vehicle 120. As a non-limiting example, in pet mode, the vehicle control manager computer may cause any one or more of the following to occur: one or more windows 122 to lower from a closed position to an open position; adjusting the sunroof 126 to slide from a closed position to an open position so as to provide adequate ventilation for the pet 106; opening a door of the vehicle 120 (e.g., a rear side door or a trunk door/lift gate 124) from the closed position to an open position to provide the pet 106 access into the vehicle 120; adjusting the recline position of all or a portion of one or more rows of back seats 128 from an upright position to a folded or reclined position so that at least a portion of the seat back of at least one of rows of seats 128 is horizontal or substantially horizontal to create more room and a flatter consistent surface in the rear of the vehicle 120; adjusting the temperature and/or level of ventilation (e.g., air conditioning and heating) in at least a portion of the vehicle 120; adjusting the type of audio/video being played (e.g., radio station, compact disc, digitally stored music, DVD, digitally stored video and/or the level of the audio output through the vehicles entertainment system in at least a portion of the vehicle 120; adjusting the child locks on one or more of the rear doors of the vehicle 120 from an unarmed position to an armed position to prevent the interior door handles of the vehicle 120 from being able to open the respective door of the vehicle 120; and/or adjusting one or more of the window locks for one or more of the rear windows 122 of the vehicle 120 from an unarmed position to an armed position to prevent the window adjustment selectors for each respective window 122 from operating the window 122 so that the pet 106 does not inadvertently adjust the amount that the window 122 has been automatically opened.

Figure 2:
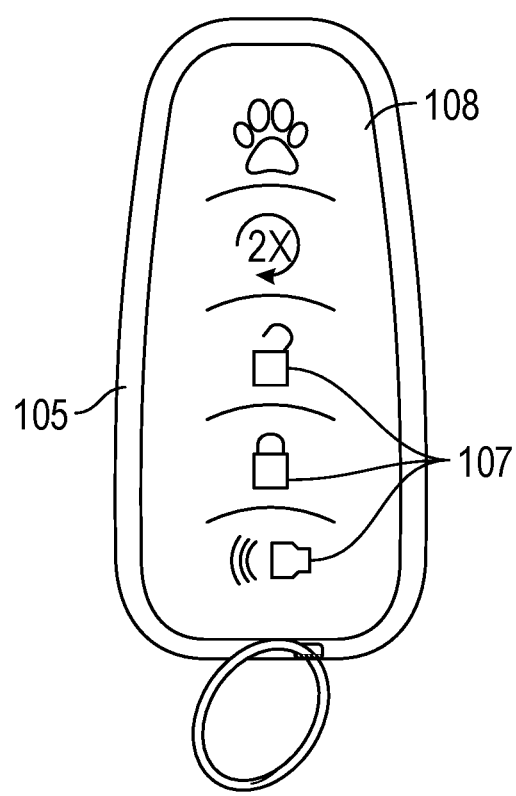
FIG. 2 shows an example key fob having a dedicated pet mode key, according to example embodiments of the disclosure.

FIG. 2 shows an example key fob having a dedicated pet mode key, according to example embodiments of the disclosure. Referring to FIG. 2, the example key fob 105 is a hand-held device that includes multiple selectors 107, 108. In certain examples, each selector 107 and the activation thereof can be associated with a particular function, such as locking or unlocking doors or operating an alarm at the vehicle 120. In addition to these conventional key fob functions, a dedicated pet mode selector 108 is provided on the key fob 105 (as designated by the paw print icon, for example) adjacent each of the other selectors 107. The example key fob 105 can also include a power source (e.g., a battery), a control chip that generates a coded wireless signal, and a short-range radio transmitter (or transceiver, in cases where the key fob 105 can also receive signals) that wirelessly sends the coded wireless signal to a receiver (or transceiver) operatively connected to the vehicle control manager computer 150. As an example, the control chip can generate a rolling code along with a function code that instructs the vehicle control manager computer 150 that the pet mode selector 108 was pressed. The rolling code can be a code that is generated using a pseudorandom number generator, for example. The vehicle control manager computer 150 can generate the same series of pseudorandom numbers, and check to determine whether the received code matches the current number in the series. It is to be understood that other techniques for generating (and decoding) a coded wireless signal between the key fob 105 and the vehicle control manager computer 150 can be used. Furthermore, it is to be understood that the coded wireless signal can include encrypted data. It is to be further understood that the key fob 105 can be used in conjunction with a remote keyless entry system (RKE) and/or a remote keyless ignition system (RKI). In some embodiments, the key fob 105 will include a transponder. Finally, although the key fob 105 described herein is a "dumb" device inasmuch that it does not perform advanced logic, it is to be understood that instead of the fob device 108, an "intelligent" hand-held user mobile computing device (such as the illustrated user mobile device 103) capable of sending a coded wireless signal or the like (e.g., data packets) could be used. Examples of such user mobile devices 103 useable to transmit a coded wireless signal or the like include a smartphone, a tablet computer, and various wearable devices such as a smart watch, each of which could be equipped with a suitable application or app to perform necessary functionality. It is to be understood that the communication path from the user mobile device 103 to the vehicle control manager 150 could include a Bluetooth connection or the like, Wi-Fi, or even the Internet in various such cases.

Figure 3:
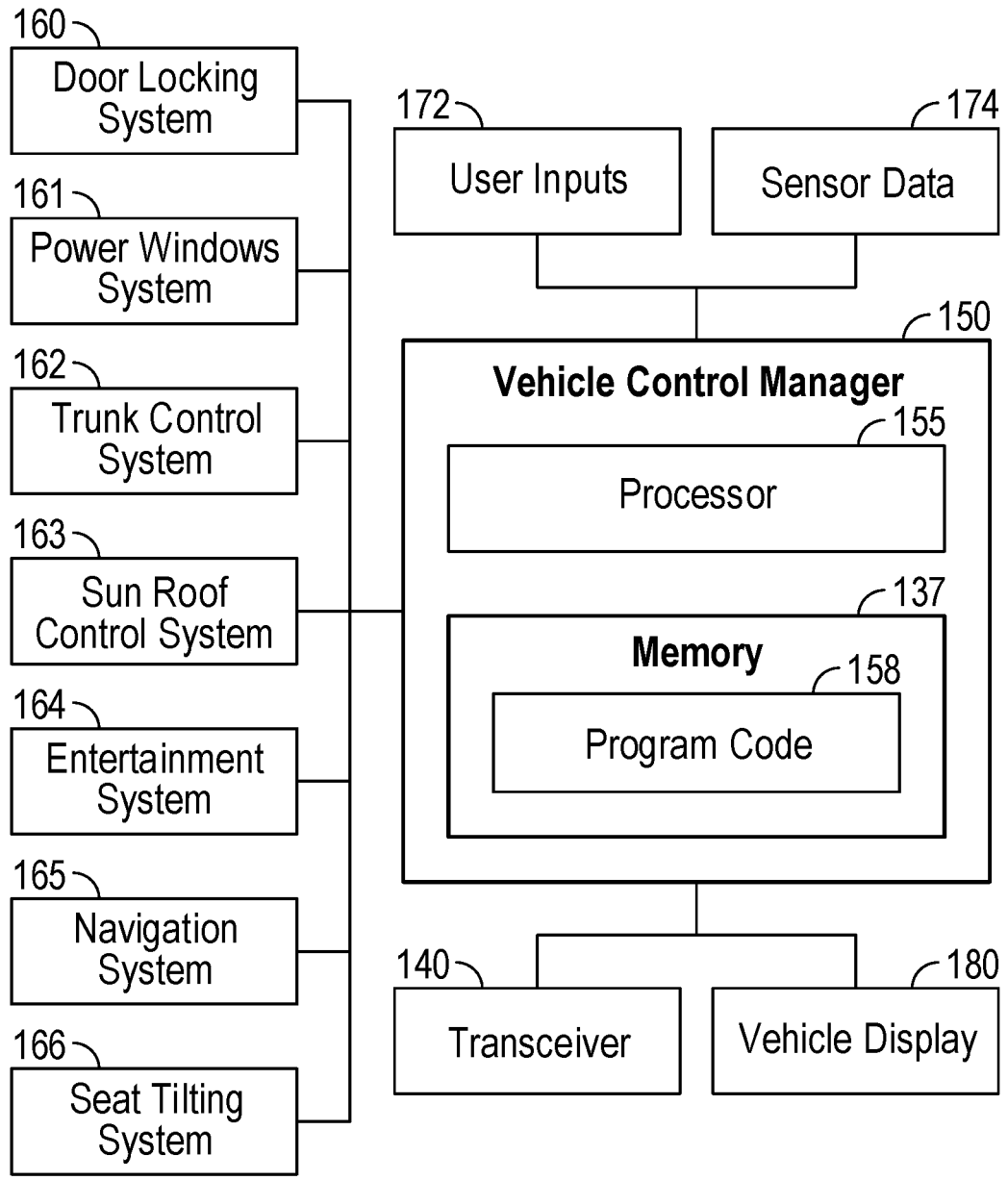
FIG. 3 shows a block diagram of an example vehicle control manager computer system, according to example embodiments of the disclosure.

Referring to FIG. 3, a block diagram of an example vehicle control manager computer 150, according to an example embodiment, is illustrated. In the example embodiment, the vehicle control manager computer 150 includes a processor 155 and memory 137 (including a stored set of instructions embedded thereon, herein referred to as program code 158) communicably coupled to the processor 155. The processor 155 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), a programmable logic processor (PLC), and so forth. Alternatively, the processor 155 can be another type of computing device or even a hardwired circuit.

The program code 158 can include a set of instructions to control operation of the processor 155. The inputs into the processor 155 can include user inputs 172, and in some embodiments, sensor data 174. In certain examples, user inputs 172 can be received via the key fob 105, the user mobile device 103, and/or a touch screen portion of a vehicle display 180. In the description of the vehicle control manager computer 150 disclosed herein, focus is on employing the vehicle control manager computer 150 for the purposes of creating a pet-friendly automotive environment in the vehicle 120. However, it is to be understood that the vehicle control manager computer 150 could be used to control a variety of other automotive functions, such as to turn the engine of the vehicle 120 on remotely. It is also to be understood that the examples described herein are presented for clarity and simplicity of exposition, and are not meant to be limiting. Furthermore, it is to be understood that some or all of the functionality of the vehicle control manager computer 150 could be incorporated into other existing computer systems of the automotive vehicle 120.

As shown in FIG. 3, the vehicle control manager computer 150 can be operatively and communicably connected to a door lock system 160, a power window system 161, a trunk/lift gate control system 162, a sunroof control system 163, an entertainment system 164, a navigation system 165, and a seat tilting/folding system 166. It is to be understood that the systems 160-166 are presented for illustrative purposes only, and other such systems could be operatively and communicably connected to the vehicle control manager computer 150, if desired. For example, in some embodiments, the vehicle control manager computer 150 can be operatively and communicably connected to the vehicle's heating and/or air conditioning system, and configured to be able to adjust the temperature setting and/or fan levels of the heating and/or air conditioning systems. In other embodiments, the vehicle control manager computer 150 can be connected to a hydration system to ensure that fresh, cool water is available for the pet 106. Furthermore, it is to be understood that certain of the systems 160-166 need not be included. Accordingly, the examples described herein are not meant to be limiting.

In operation, a wireless control signal is received from the key fob 105 or user mobile device 103 via one or more antenna disposed in the vehicle 120 and electrically connected to a transceiver 140 in the automotive vehicle 120 where the signal is demodulated. The demodulated signal data is then transmitted from the transceiver 140 to the vehicle control manager computer 150. The vehicle control manager computer 150 (e.g., via the processor 155) validates a code in the received wireless control signal (e.g., a 40-bit pseudorandom number) against an expected value. If the received code matches the expected value, the code is validated. The vehicle control manager computer 150 (e.g., via the processor 155) may then examine a function code included in the received wireless signal to determine the particular function to be performed at the vehicle 120. For example, if the user 101 selected a selector 107 on the key fob 105 for locking the doors, the function code would trigger a door lock operation. For example, the processor 155 can identify the function code as requesting a door lock operation based on a comparison of the function code to stored function codes in memory 137 and can transmit a signal to the door locking system 160 to lock all of the doors of the vehicle 120.

As will be described in greater detail below, if the user 101 selects (e.g., presses) the pet mode selector 108, the function code received by the vehicle control manager computer 150 would denote that the pet mode selector 108 was pressed. The processor 155 can determine if the vehicle 120 is already operating in pet mode by, for example, evaluating a pet mode status in memory 137. If the processor 155 determines that the vehicle 120 is not presently in pet mode, the vehicle control manager computer 150 can set the system to pet mode and consult a database (memory 137) to determine what vehicle parameters need to be adjusted and at what level each parameter is to be adjusted. For each specified vehicle parameter to be adjusted, the vehicle control manager computer 150 would transmit a control signal, via the processor 155, to each respective system (e.g., systems 160-166) to perform a specified task. As an example, the vehicle control manager computer 150 may transmit a signal to the power windows system 161 to cause one or more of the vehicle windows 122 to be adjusted from an closed position to an open position; transmit a signal to the sunroof control system 163 to adjust the sunroof 126 from a closed position to an open position; transmit a signal to the trunk control system 162 to adjust the lift gate 124 of the vehicle from a closed configuration to an open configuration to provide access for the pet 106 to enter the vehicle 120; and transmit a signal to the seat tilting system 166 to tilt or fold one or more seat backs within one or more rows of back seats 128 from a vertical position to a horizontal or substantially horizontal position to create more room for the pet 106. In another example, the user 101 can previously select the pet mode settings to further include playing relaxing music for the pet's enjoyment. In this example, the vehicle control manager computer 150 (e.g., via the processor 155) can transmit a signal to the entertainment system 164 to play a certain piece of music (e.g., from a compact disc or digitally stored music in memory 137) or turn on a previously specified radio station.

In certain example embodiments, to ensure that the pet mode selector 108 on the key fob 105 was not pressed by mistake by the user 101, for some or all operations, a first receipt of the control signal from the key fob 105 in response to the pet mode selector 108 being pressed once is ignored. In this example, the pet mode selector 108 on the key fob 105 would have to be selected (e.g., pressed) twice for any action to be taken (e.g., adjusting the vehicle 120 into pet mode or out of pet mode).

Figures 4, 5:
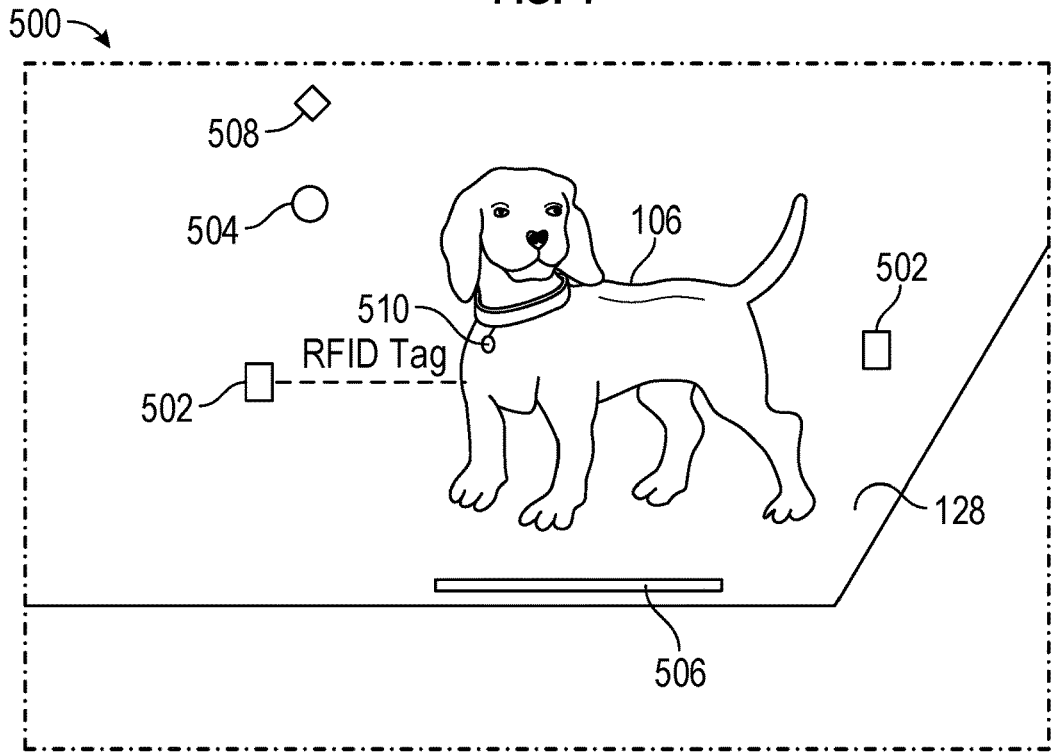
FIG. 4 shows an example user interface for the receipt of user input of features to be activated to create the pet-friendly automotive conditions in the automotive vehicle, according to example embodiments of the disclosure.
FIG. 5 shows an example arrangement of sensors useable for determining the presence of a pet inside an automotive vehicle, according to example embodiments of the disclosure.

Referring to FIG. 4, an example user interface 180 for user selection of features to be activated to create the pet-friendly automotive conditions, according to an example embodiment, is illustrated. In one example, the user interface 180 can be incorporated into an existing user settings menu system, and displayed to the driver in the console area on a vehicle display 180, for example. The vehicle display 180 can include an input mechanism (e.g., a mouse, toggle switch, or touch screen) for receiving user input and allowing the user 101 to adjust, add, or delete certain actions to be completed when placing the vehicle in pet mode. In other example embodiments, the user interface can be accessed via the user mobile device 103 or another computer communicably coupled to the vehicle control manager computer 150.

As shown in FIG. 4, the user interface 180 includes several items that can be selected and/or modified by the user 101 for pet mode within the vehicle 120. The first feature shown uses check boxes useable for selecting whether any windows are to be lowered. In particular, by checking the appropriate boxes, the user has the ability to select the front windows, the back windows, or both front and back windows. While not shown, the user interface 180 could provide a selection option for each individual window within the vehicle 120. Additionally, for each window, a slider is provided to select the percentage that the particular window is to be lowered.

Additionally, the example user interface 180 provides checkboxes for selection of operations to open the trunk, open the sunroof, tilt/fold the rear row seats 128b, tilt the middle row seats 128a (for vehicles with three rows of seating), play audio, and adjust the air conditioning/heat. With regard to the operation of opening the trunk/lift gate, in some embodiments, the option may further include an option to select any one of the doors of the vehicle for opening during pet mode. The ability for the user 101 to select a door other than then trunk/lift gate to be opened when initiating pet mode may be useful for vehicles that do not include trunk access to the interior of the vehicle (e.g., many conventional 2-door and 4-door vehicles) or for older or smaller pets 106 that may have a difficult time leaping high enough to access the trunk area of the vehicle 120. With regard to the operation of tilting/folding the rear seats 128b and the middle row seats 128a, in some embodiments, each of these operations may further include the option to tilt/fold the seat backs of only a portion of the respective row of seats 128. For example, one or both of the middle row 128a and the rear row 128b of seats may be divided into two or more seats that can be individually tilted/folded. The user 101 could then be provided with an option to only fold/tilt a portion of the row (either middle row 128a or rear row 128b) of seats.

In certain example embodiments, sliders can also be provided for adjustment of the sunroof and the air conditioning/heating. In the case of the air conditioning and heating, the user may additional be provided with the ability to select the temperature desired and if the selection is intended only for controlling a separate rear ventilation system in the vehicle 120. In the case of playing audio, the user may further select whether the music is to be provided by radio, by compact disc (not shown), or via an MP3 player. Once the user completes the user-adjustable pet mode settings for the vehicle 120, the associated data is collected and stored in a database (or file) in the memory 137 of the vehicle control manager computer 150. It is to be understood that the user interface 180 (Pet Mode Setup screen) is somewhat rudimentary but could include various other graphical and functional features.

Referring the FIG. 5, an example arrangement of sensors 502-508 useable for determining the presence of a pet 106 inside a vehicle 120, according to an example embodiment, is illustrated. The pet mode feature is designed to provide a comfortable and safe environment for a pet 106 travelling in an automotive vehicle 120. However, when a pet 106 is no longer in the vehicle 120, it may be desirable to turn the pet mode off within the vehicle 120. For example, once a vehicle 120 reaches its final destination, the driver/user 101 may wish to cancel pet mode (adjust vehicle parameters for operations performed under pet mode to the previous setup of vehicle parameters). For example, if under the pet mode setup, the windows were lowered, the sunroof was opened, and the rear seats were tilted, then "cancelling" these operations would include adjusting vehicle parameters to a previous setup of vehicle parameters that might include parameters for closing the windows and sunroof, and putting the seat backs of the rear seats in their upright, generally vertical, position. In some embodiments, cancellation of pet mode can be accomplished by the user 101 pressing the pet mode selector 108 on the key fob 105 another time (or another two times in a manner similar to initiating the pet mode feature as described above). However, the user 101 may forget to do this, only to discover at a later point in time that pet mode is still on or active within the vehicle 120. Accordingly, in an example embodiment, various sensors may be communicably coupled to the vehicle control manager computer 150 (e.g., the processor 155) and those sensors may be used to determine whether the pet 106 is still in the vehicle 120. If the vehicle control manager computer 150 determines, based on the sensor data, that the pet is no longer in the vehicle, the vehicle control manager computer 150 may transmit signals to the respective systems 160-166 to adjust vehicle parameters for operations performed under pet mode to the previous setup of vehicle parameters and exit pet mode.

As shown in FIG. 5, an interior portion of the automotive vehicle 120 includes an area 500 that a pet 106 is situated within. In one example, the area 500 can encompass any portion of the vehicle 120 that is positioned behind the front seats 129 of the vehicle 120. One or more sensors can be placed within this area 500, in the vicinity of the pet 106 and communicably coupled to the vehicle control manager computer 150. In one example, the sensors can include one or more motion sensors 502, one or more infrared sensors 504, a weight scale 506, and an RFID sensor 508. The motion sensors 502 can be photo motion sensors that include a device that employs a laser beam and a light sensor. If the pet 106 was previously within the path of the laser beam during the trip, and no longer is within the path for each of the motion sensors 502, a determination can be made by the processor 155 that the pet 106 is no longer in the vehicle 120.

Additionally, or alternatively, the infrared sensor 504 can be used to determine whether the pet 106 is still within the vehicle 120 by detecting or not detecting heat from the pet 106. A weight scale 510 can also be used to determine whether the pet 106 is still in the vehicle 120. For example, the weight scale 510 can provide weight data to the vehicle control manager computer 150 which can compare the weight data to a preset weight value (e.g., a tare weight) to determine if the pet 106 is within the vehicle 120. For example, the measured weight in the space 500 or a portion of the space 500 would be reduced significantly once the pet 106 is no longer in the vehicle 120 and that weight would be the same or within a predetermined limit of the present weight value.

Additionally, or alternatively, an RFID sensor 508 can be placed within the vehicle 120 and communicably coupled to the vehicle control manager computer 150. The RFID sensor 508 can be used to sense the absence of the pet 106 having an RFID tag 510 attached to its collar (or to another portion of the pet 106). Although various sensors have been described, herein, it is to be understood that other such sensors could be used to determine the presence or absence of a pet within a vehicle. In addition, the vehicle control manager computer 150 can use one or any combination of the data from the sensors to make a determination as to whether the pet 106 is within the vehicle 120.

Furthermore, a probabilistic model can be employed to determine with a degree of confidence whether the pet is still within the vehicle. Once a degree of confidence is calculated, appropriate action can be taken. Such action can include automatically turning pet mode off or providing only an informational message to the driver (e.g., via the vehicle display 180) stating that it appears that the pet is no longer in the vehicle 120. Along with the informational message, the driver can be prompted to turn off pet mode (e.g., via the key fob 105, the user mobile device 103, and/or the vehicle display 180). In some situations, the driver may not want to turn pet mode off even though the pet 106 is no longer in the vehicle 120, such as when the pet has temporarily left the vehicle 120 in a rest area during a long trip. Finally, as will be described below, in some embodiments, the vehicle's navigation system 165 can be consulted to determine whether the vehicle 120 has arrived at the final destination, providing a greater degree of confidence in a determination as to whether to turn pet mode off.

In the following portion of the disclosure, various example methods of operation are provided. It is to be understood that these example methods utilize the control manager 150 to perform logical operations.

Figure 6:
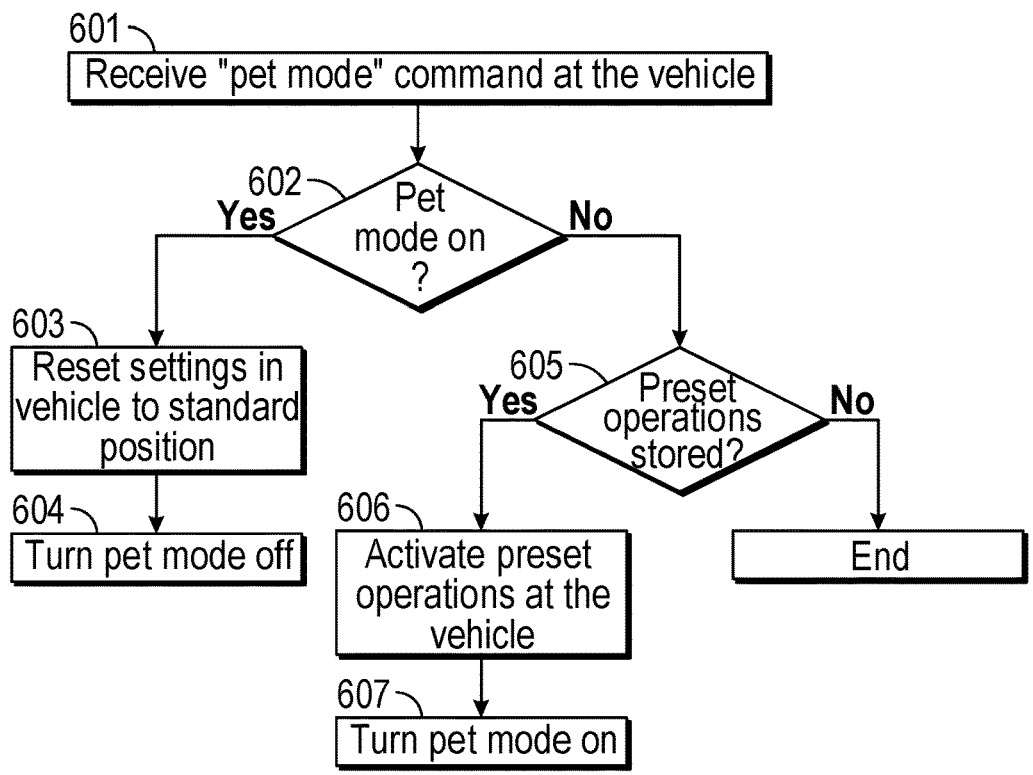
FIG. 6 shows an example flow diagram of a method for creating a pet-friendly automotive environment in an automotive vehicle, according to example embodiments of the disclosure.

FIG. 6 is an example flow diagram of a method 600 for creating a pet-friendly automotive environment in a vehicle 120, according to one example embodiment of the disclosure. Referring to FIGS. 1-6, the method 600 can begin at step 601, where a "pet mode" command is received by the transceiver 140 via a wireless signal from the key fob 105 or user mobile device 103 and passed to the vehicle control manager computer 150. As noted above, the command can be a coded wireless signal containing a function code denoting the pet mode.

In step 602, a determination is made by the vehicle control manager computer 150 as to whether pet mode is currently activated ("on") for the vehicle 120. In one example, to make this determination, the processor 155 can consult a database in memory 157 (or external storage) to determine the current status (e.g., on or off) of the pet mode setting for the vehicle 120. For example, the pet mode settings and status may be stored in a table in memory 157. If the current record associated with the database table indicates that pet mode is currently "off," then the processor 155 determines that pet mode is currently off for the vehicle 120 and will begin the process to turn on or otherwise activate pet mode. On the other hand, if the current record associated with the table indicates that pet mode is "on," then the processor 155 determines that pet mode is currently on for the vehicle and will begin the process to turn off or otherwise deactivate pet mode. Alternatively, the information regarding the status of pet mode in the vehicle 120 may be stored in a simple file rather than as a database table in memory 137.

If the vehicle control manager computer 150 determines that pet mode is currently on for the vehicle 120, the YES branch is followed to step 603 where the pet mode settings are reset to their standard positions (which can be the previous parameter values). For example, the processor 155 can determine which vehicle parameters were adjusted in pet mode (and optionally the extent to which they were adjusted (e.g., rear windows opened 25%). Based on that information, the processor 155 can transmit signals to the respective vehicle systems 160-166 (as needed) to adjust the parameters associated with each of the respective systems 160-166 back to their original (pre-pet mode) positions or settings. For example, if the windows were rolled down from a closed position and the seat backs of the rear seats tilted back during pet mode, then the windows would be rolled back up to the closed position and the seat backs of the rear seats placed in their upright position. Next, in step 604, pet mode would be turned off. In one example, the processor 155 can update the current pet mode values in the database table (or file) in memory 137.

Returning to step 602, if processor 155 determines that pet mode is currently off for the vehicle, then the NO branch can be followed to step 605. In step 605, a determination is made as to whether any pet mode features were selected by the user (see, for example, FIG. 4). In one example, the determination can be made by the processor 155 evaluating a database table or file in memory 137 to determine if the user 101 has added or modified any of the preset functions and adjustments associated with pet mode. If the processor 155 determines that there are preset pet mode adjustments and/or previously entered user-selected pet mode adjustments, then the YES branch is followed to step 606, where the processor 155 can transmit signals to the vehicle system 160-166 corresponding to the vehicle parameters that have been preset for the vehicle in pet mode and/or that the vehicle parameters that the user 101 has added or modified from the preset parameters for pet mode, to make the identified changes to the selected parameters on the vehicle 120.

For example, the processor 155 could determine from memory 137 that in pet mode, the rear window should be opened, the sunroof should be opened, and rear row of seats should be folded down in the forward direction, the trunk door or lift gate should be opened, the audio level of the vehicle should be turned down, the audio source should be set to the compact disc, the temperature level in the rear of the vehicle should be lowered to 68 degrees Fahrenheit, the fan level for the rear ventilation system should be turned to level two, the child locks should be armed for the rear doors, and the window locks should be armed for the windows behind the front seats 129. Based on this information, in, for example, the pet mode setup (FIG. 4) in memory 137, the processor 155 can transmit a signal to the power windows system 161 to adjust the rear windows from a closed position to an open position and to arm the window lockouts for the windows behind the front seats 129 (e.g., which prevent further adjustment of the windows), transmit a signal to the sunroof control system 163 to adjust the sunroof from the closed position to an open position, send a signal to the seat tilting system 166 to fold the rear row of seat down in the forward direction, transmit a signal to the truck control system 162 (e.g., which can control the opening and closing of any door of the vehicle 120) to open the trunk door/lift gate of the vehicle 120 and arm the child locks for the rear doors and/or trunk door/lift gate, send a signal to the entertainment system 164 to change the audio source to the compact disc and reduce the volume level to the user-selected level, and send a signal to the HVAC system of the vehicle to adjust the temperature level for the rear air conditioning system to 68 degrees Fahrenheit and increase the fan level to level two.

In step 607, processor 155 can change the current pet mode operating status in the database or file in memory 137 to reflect that pet mode is turned on for the vehicle 120.

Figure 7:
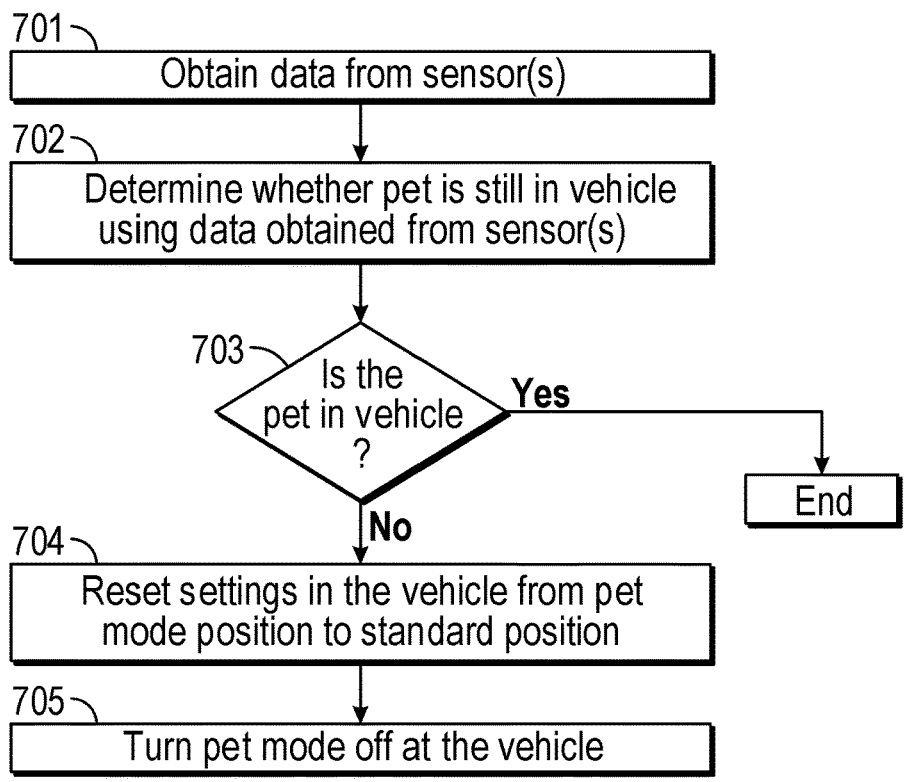
FIG. 7 shows an example flow diagram of a method for determining whether to turn pet mode off in an automotive vehicle using sensor data, according to example embodiments of the disclosure.

FIG. 7 is an example flow diagram of a method 700 for determining whether to turn pet mode off using sensor data, according to one example embodiment of the disclosure. Referring to FIGS. 1-5 and 7, the method 700 can start at step 701, where the vehicle control manager computer 150 (e.g., via the processor 155) can collect or receive sensor data 174 from the one or more sensors 502-508 in the vehicle 120. As mentioned with reference to FIG. 5, the sensors can include one or more motion sensors 502, one or more infrared sensors 504, an RFID sensor 506, and one or more weight scales 508, etc.

In step 702, the processor 155, can determine if the pet 106 is still in the vehicle 120 based on the sensor data 174 obtained from the sensor(s) 502-508. In one example embodiment, the processor 155 can employ a probabilistic model using the sensor data 174 to determine with a degree of confidence whether the pet 106 is still within the vehicle 120. Once a degree of confidence is calculated, appropriate action can be taken. The probabilistic model can include a weighted model that considers certain sensor data 174 from certain sensors 502-508 or combinations of sensor data 174 from a combination of sensors 502-508 to be more valuable (and hence more heavily weighted). The probabilistic model may also take into consideration sensor data 174 obtained from the one or more sensors 502-508 during a predetermined length of time (e.g., changes in measured animal movement, weight, and heat from when the vehicle 120 was started to the present moment), animal characteristics, etc.

If the processor 155 determines with a high degree of confidence (e.g., a confidence over a predetermined probabilistic threshold) that the pet 106 is no longer in the vehicle 120, in step 704, the processor can transmit signals to the appropriate vehicle systems 160-166 to cancel pet mode operations and return the vehicle attributes back to the positions/settings they were in immediately prior to pet mode being turned on. In step 705, the processor 155 can change the current pet mode operating status in the database or file in memory 137 to reflect that pet mode is turned off for the vehicle 120.

As was mentioned, instead of automatically turning pet mode off and resetting the operations, in another example embodiment, an informational message to the driver stating that it appears that the pet 106 is no longer in the vehicle 120 can be outputted to the vehicle display 180 and/or the user mobile device 103. Along with the informational message, the driver can be prompted to turn off pet mode (e.g., via the user mobile device 103, the key fob 105, and/or the vehicle display 180. In some situations, the driver may not want to turn pet mode off even though the pet is no longer in the vehicle, such as when the pet has only temporarily left the vehicle.

Figure 8:
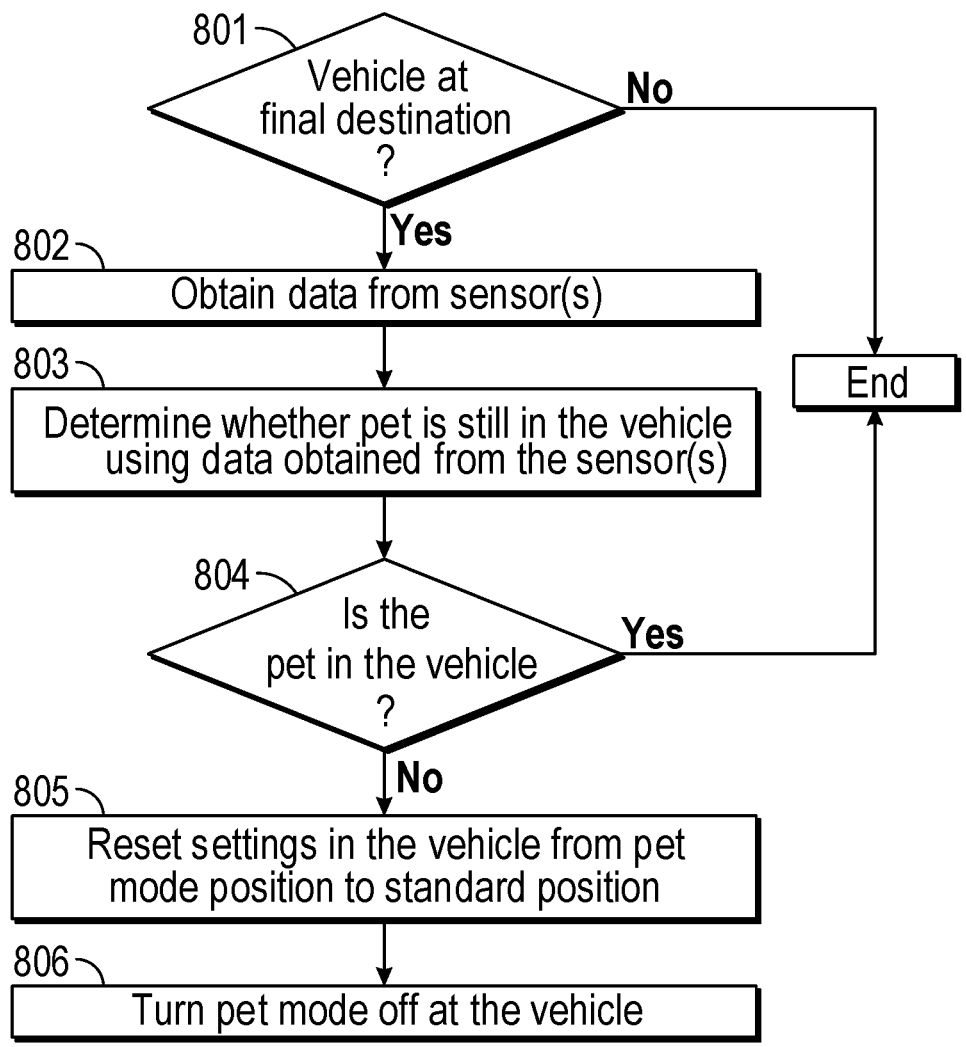
FIG. 8 shows an example flow diagram of another method for determining whether to turn pet mode off in an automotive vehicle using sensor data, according to example embodiments of the disclosure.

FIG. 8 is an example flow diagram of a method 800 for determining whether to turn pet mode off using sensor data, according to another example embodiment of the disclosure. The method 800 is substantially similar to the method 700 except that an initial step (step 801) is provided to determine whether the vehicle is at the final destination. Steps 802, 803, 804, 805, and 806 correspond to steps 701, 702, 703, 704, 705, respectively and incorporates the information of those steps herein. As such, steps 802, 803, 804, 805, and 806 will not be repeated herein for the sake of brevity.

Referring now to FIGS. 1-5, 7, and 8, in step 801, the processor 155 consults the navigation system 165 to determine whether the current vehicle location is at the final destination point for the vehicle 120 on a current trip. This assumes that the user has employed the navigation system 165 during the trip, and has indicated the final destination of the journey. Suppose, for example, the final destination of a return road trip from the Grand Canyon is the user's home in Phoenix, Ariz. Even though during the return trip the vehicle 120 made several stops along the route home during which the pet 106 temporarily left the vehicle 120, pet mode would not be turned off yet. Accordingly, method 800 includes a requirement that the vehicle 120 be at the final destination. Only then, and after the processor 155 also determining that the pet is no longer in the vehicle 120, will pet mode be turned off as described in steps 704-705 above.

Although the vehicle pet mode features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

EXAMPLE EMBODIMENTS

Example 1 may include a method for creating a pet-friendly environment in an automotive vehicle, comprising: receiving, by a vehicle computer of the automotive vehicle, a coded wireless signal to adjust a plurality of vehicle parameters in the automotive vehicle; adjusting, by the vehicle computer and in response to the signal, at least one door of the automotive vehicle from a closed position to an open position; and adjusting, by the vehicle computer and in response to the signal, at least one additional vehicle parameter of the plurality of vehicle parameters from a first setup to a second setup.

Example 2 may include the method of example 1, wherein the coded wireless signal is received from a key fob responsive to a single dedicated button of the key fob being selected.

Example 3 may include the method of example 1 and/or some other example herein, wherein the coded wireless signal is received from a user mobile device.

Example 4 may include the method of example 1 and/or some other example herein, wherein adjusting the at least one additional vehicle parameter comprises adjusting at least one window of the automotive vehicle from a first closed position to a first open position.

Example 5 may include the method of example 4 and/or some other example herein, wherein adjusting the at least one additional vehicle parameter further comprises adjusting a sunroof of the automotive vehicle from a second closed position to a second open position.

Example 6 may include the method of example 1 and/or some other example herein, wherein adjusting the at least one additional vehicle parameter comprises tilting at least a portion of a row of seats of the automotive vehicle from an upright position to a folded or reclined position.

Example 7 may include the method of example 6 and/or some other example herein, wherein the automotive vehicle comprises: at least one front seat; a middle row comprising at least one seat; and a back row comprising at least one seat, wherein tilting at least a portion of a row of seats comprises tilting at least a portion of the at least one seat in the middle row and the at least one seat in the back row.

Example 8 may include the method of example 1 and/or some other example herein, wherein the at least one door is a trunk door of the automotive vehicle.

Example 9 may include the method of example 1, wherein adjusting at least one additional vehicle parameter of the plurality of vehicle parameters comprises one or more of adjusting an audio level, adjusting an audio selection, adjusting a temperature level in at least a portion of the automotive vehicle; adjusting a ventilation level in at least a portion of the automotive vehicle, arming a child lock device on at least one rear door of the automotive vehicle; and arming a window lock on at least one window of the automotive vehicle.

Example 10 may include the method of example 1 and/or some other example herein, further comprising: receiving, by the vehicle computer, a user input of the at least one additional vehicle parameter to adjust in response to the receipt of the coded wireless signal; storing, by the vehicle computer, the user input of the at least one additional vehicle parameter to adjust; and identifying, by the vehicle computer, the user input of the at least one additional vehicle parameter to adjust in response to the receipt of the coded wireless signal.

Example 11 may include the method of example 1 and/or some other example herein, further comprising: receiving, by the vehicle computer, a second coded wireless signal subsequent to the coded wireless signal; determining, by the vehicle computer, that the automotive vehicle is in a pet mode; and adjusting, by the vehicle computer, the at least one vehicle parameter from the second setup to the first setup.

Example 12 may include the method of example 1 and/or some other example herein, further comprising: receiving, by the vehicle computer, sensor data from at least one sensor within the automotive vehicle; determining, by the vehicle computer and based on the sensor data, if a pet is inside of the automotive vehicle; and adjusting, by the vehicle computer, the at least one vehicle parameter from the second setup to the first setup based on a negative determination that the pet is inside of the automotive vehicle.

Example 13 may include a system for creating a pet-friendly environment in an automotive vehicle, comprising: a hand-held wireless device configured to wirelessly transmit a coded wireless signal; a vehicle computer disposed within an automotive vehicle and in wireless communication with the hand-held wireless device, the vehicle computer capable of controlling a plurality of vehicle systems in the automotive vehicle and comprising: memory operable to store computer-executable instructions; and a processor configured to access the memory and execute the computer-executable instructions to: receive, from the hand-held wireless device, a first coded wireless signal to adjust a plurality of vehicle parameters in the automotive vehicle; adjust, in response to the first coded wireless signal, at least one door of the automotive vehicle from a closed position to an open position; and adjust, in response to the first coded wireless signal, at least one additional vehicle parameter of the plurality of vehicle parameters from a first setup to a second setup.

Example 14 may include the system of example 13, wherein adjusting at least one additional vehicle parameter of the plurality of vehicle parameters comprises one or more of: adjusting at least one window of the automotive vehicle from a first closed position to a first open position, adjusting a sunroof of the automotive vehicle from a second closed position to a second open position, tilting at least a portion of a row of seats of the automotive vehicle from an upright position to a folded or reclined position, adjusting an audio level, adjusting an audio selection, adjusting a temperature level in at least a portion of the automotive vehicle; adjusting a ventilation level in at least a portion of the automotive vehicle, arming a child lock device on at least one rear door of the automotive vehicle; and arming a window lock on at least one window of the automotive vehicle.

Example 15 may include the system of example 13 and/or some other example herein, further comprising: at least one sensor communicably coupled to the processor of the vehicle computer, wherein the processor is further configured to access the memory and execute the computer-executable instructions to: receive sensor data from the at least one sensor; determine, based on the sensor data, if a pet is inside of the automotive vehicle; and adjust the at least one vehicle parameter from the second setup to the first setup based on a negative determination that the pet is inside of the automotive vehicle.

Example 16 may include the system of example 15 and/or some other example herein, wherein the processor uses a probabilistic model to determine if the pet is inside of the automotive vehicle.

Example 17 may include the system of example 15 and/or some other example herein, further comprising a navigation system communicably coupled to the processor, wherein the processor is further configured to access the memory and execute the computer-executable instructions to: receive an indication from the navigation system that the automotive vehicle has reached a destination; wherein adjusting the at least one vehicle parameter from the second setup to the first setup is based on the negative determination that the pet is inside of the automotive vehicle and the indication that the automotive vehicle has reached the destination.

Example 18 may include the system of example 13 and/or some other example herein, wherein the hand-held wireless device is one of a key fob and a mobile computing device.

Example 19 may include a method for creating a pet-friendly environment in an automotive vehicle, comprising: receiving, by a vehicle computer of the automotive vehicle, a first coded wireless signal to adjust a plurality of vehicle parameters in the automotive vehicle; adjusting, by the vehicle computer and in response to the signal, a first vehicle parameter of the plurality of vehicle parameters from a first setup to a second setup; and adjusting, by the vehicle computer and in response to the signal, a second vehicle parameter of the plurality of vehicle parameters from a third setup to a fourth setup.

Example 20 may include the method of example 19, further comprising: receiving, by the vehicle computer, a second coded wireless signal subsequent to the coded wireless signal; determining, by the vehicle computer, that the automotive vehicle is in a pet mode; adjusting, by the vehicle computer, the first vehicle parameter from the second setup to the first setup; and adjusting, by the vehicle computer, the second vehicle parameter from the fourth setup to the third setup.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Conditional language, such as, among others, "can," "could," "might," or "may," unless specifically stated otherwise, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What is claimed is:

1. A method for creating a pet-friendly environment in an automotive vehicle, comprising:
   receiving, by a vehicle computer of the automotive vehicle, a first coded wireless signal to adjust a plurality of vehicle parameters in the automotive vehicle;
   determining, by the vehicle computer, that the automotive vehicle is in a pet mode;
   adjusting, by the vehicle computer and in response to the first coded wireless signal, at least one door of the automotive vehicle from a closed position to an open position;
   adjusting, by the vehicle computer and in response to the first coded wireless signal, at least one additional vehicle parameter of the plurality of vehicle parameters from a first setup to a second setup, wherein the second setup comprises adjusting door locks on one or more rear doors of the automotive vehicle from an unarmed position to an armed position and adjusting window locks on one or more rear windows of the automotive vehicle from the unarmed position to the armed position;
   receiving, by the vehicle computer, a second coded wireless signal subsequent to the first coded wireless signal;
   determining, by the vehicle computer, that the automotive vehicle is located at a final destination for a trip;
   determining, by the vehicle computer, that a pet is not located in the automotive vehicle;
   determining, by the vehicle computer that the automotive vehicle is not in the pet mode based at least in part on the automotive vehicle being located at the final destination and no pet being located in the automotive vehicle; and
   adjusting, by the vehicle computer, the at least one vehicle parameter from the second setup to the first setup.

2. The method of claim 1, wherein the first coded wireless signal is received from a key fob responsive to a single dedicated button of the key fob being selected.

3. The method of claim 1, wherein the first coded wireless signal is received from a user mobile device.

4. The method of claim 1, wherein adjusting the at least one additional vehicle parameter comprises adjusting at least one window of the automotive vehicle from a first closed position to a first open position.

5. The method of claim 4, wherein adjusting the at least one additional vehicle parameter further comprises adjusting a sunroof of the automotive vehicle from a second closed position to a second open position.

6. The method of claim 1, wherein adjusting the at least one additional vehicle parameter comprises tilting at least a portion of a row of seats of the automotive vehicle from an upright position to a folded or reclined position.

7. The method of claim 6, wherein the automotive vehicle comprises:
   at least one front seat;
   a middle row comprising at least one seat; and
   a back row comprising at least one seat,
   wherein tilting at least a portion of a row of seats comprises tilting at least a portion of the at least one seat in the middle row and the at least one seat in the back row.

8. The method of claim 1, wherein the at least one door is a trunk door of the automotive vehicle.

9. The method of claim 1, wherein adjusting at least one additional vehicle parameter of the plurality of vehicle parameters comprises one or more of adjusting an audio level, adjusting an audio selection, adjusting a temperature level in at least a portion of the automotive vehicle, and adjusting a ventilation level in at least a portion of the automotive vehicle.

10. The method of claim 1, further comprising:
receiving, by the vehicle computer, a user input of the at least one additional vehicle parameter to adjust in response to the receipt of the first coded wireless signal;
storing, by the vehicle computer, the user input of the at least one additional vehicle parameter to adjust; and
identifying, by the vehicle computer, the user input of the at least one additional vehicle parameter to adjust in response to the receipt of the first coded wireless signal.

11. The method of claim 1, further comprising:
receiving, by the vehicle computer, sensor data from at least one sensor within the automotive vehicle;
determining, by the vehicle computer and based on the sensor data, if a pet is inside of the automotive vehicle based at least in part on a reading from an RFID sensor configured to detect an RFID tag attached to the pet; and
adjusting, by the vehicle computer, the at least one vehicle parameter from the second setup to the first setup based on a negative determination that the pet is inside of the automotive vehicle.

12. A system for creating a pet-friendly environment in an automotive vehicle, comprising:
a hand-held wireless device configured to wirelessly transmit a coded wireless signal;
a vehicle computer disposed within an automotive vehicle and in wireless communication with the hand-held wireless device, the vehicle computer capable of controlling a plurality of vehicle systems in the automotive vehicle and comprising:
memory operable to store computer-executable instructions; and
a processor configured to access the memory and execute the computer-executable instructions to:
receive, from the hand-held wireless device, a first coded wireless signal to adjust a plurality of vehicle parameters in the automotive vehicle;
determine, by the vehicle computer, that the automotive vehicle is in a pet mode;
adjust, in response to the first coded wireless signal, at least one door of the automotive vehicle from a closed position to an open position; and
adjust, in response to the first coded wireless signal, at least one additional vehicle parameter of the plurality of vehicle parameters from a first setup to a second setup, wherein the second setup comprises adjusting door locks on one or more rear doors of the automotive vehicle from an unarmed position to an armed position and adjusting window locks on one or more rear windows of the automotive vehicle from the unarmed position to the armed position;
receive, by the vehicle computer, a second coded wireless signal subsequent to the first coded wireless signal;
determine, by the vehicle computer, that the automotive vehicle is located at a final destination for a trip;
determine, by the vehicle computer, that a pet is not located in the automotive vehicle;
determine, by the vehicle computer, that the automotive vehicle is not in the pet mode based at least in part on the automotive vehicle being located at the final destination and no pet being located in the automotive vehicle;
adjust, by the vehicle computer, the first vehicle parameter from the second setup to the first setup; and
adjust, by the vehicle computer, the second vehicle parameter from the fourth setup to the third setup.

13. The system of claim 12, wherein adjusting at least one additional vehicle parameter of the plurality of vehicle parameters comprises one or more of: adjusting at least one window of the automotive vehicle from a first closed position to a first open position, adjusting a sunroof of the automotive vehicle from a second closed position to a second open position, tilting at least a portion of a row of seats of the automotive vehicle from an upright position to a folded or reclined position, adjusting an audio level, adjusting an audio selection, adjusting a temperature level in at least a portion of the automotive vehicle, and adjusting a ventilation level in at least a portion of the automotive vehicle.

14. The system of claim 12, further comprising:
at least one sensor communicably coupled to the processor of the vehicle computer, wherein the processor is further configured to access the memory and execute the computer-executable instructions to:
receive sensor data from the at least one sensor;
determine, based on the sensor data, if a pet is inside of the automotive vehicle based at least in part on a reading from an RFID sensor configured to detect an RFID tag attached to the pet; and
adjust the at least one vehicle parameter from the second setup to the first setup based on a negative determination that the pet is inside of the automotive vehicle.

15. The system of claim 14, wherein the processor uses a probabilistic model to determine if the pet is inside of the automotive vehicle.

16. The system of claim 14, further comprising a navigation system communicably coupled to the processor, wherein the processor is further configured to access the memory and execute the computer-executable instructions to:
receive an indication from the navigation system that the automotive vehicle has reached a final destination for a trip;
determine that the pet is not located in the automotive vehicle; and
determine that the automotive vehicle is not in the pet mode based at least in part on the automotive vehicle being located at the final destination and no pet being located in the automotive vehicle,
wherein adjusting the at least one vehicle parameter from the second setup to the first setup is based on the negative determination that the pet is inside of the automotive vehicle and the indication that the automotive vehicle has reached the destination.

17. The system of claim 12, wherein the hand-held wireless device is one of a key fob and a mobile computing device.

18. A method for creating a pet-friendly environment in an automotive vehicle, comprising:
receiving, by a vehicle computer of the automotive vehicle, a first coded wireless signal to adjust a plurality of vehicle parameters in the automotive vehicle;
determining, by the vehicle computer, that the automotive vehicle is in a pet mode;

adjusting, by the vehicle computer and in response to the first coded wireless signal, a first vehicle parameter of the plurality of vehicle parameters from a first setup to a second setup; and adjusting, by the vehicle computer and in response to the first coded wireless signal, a second vehicle parameter of the plurality of vehicle parameters from a third setup to a fourth setup, wherein the fourth setup comprises adjusting door locks on one or more rear doors of the automotive vehicle from an unarmed position to an armed position and adjusting window locks on one or more rear windows of the automotive vehicle from the unarmed position to the armed position;

receiving, by the vehicle computer, a second coded wireless signal subsequent to the first coded wireless signal;

determining, by the vehicle computer, that the automotive vehicle is located at a final destination for a trip;

determining, by the vehicle computer, that a pet is not located in the automotive vehicle;

determining, by the vehicle computer, that the automotive vehicle is not in the pet mode based at least in part on the automotive vehicle being located at the final destination and no pet being located in the automotive vehicle;

adjusting, by the vehicle computer, the first vehicle parameter from the second setup to the first setup; and adjusting, by the vehicle computer, the second vehicle parameter from the fourth setup to the third setup.

* * * * *